United States Patent [19]

Finkensiep

[11] Patent Number: 4,738,813
[45] Date of Patent: Apr. 19, 1988

[54] APPARATUS AND PROCESS FOR COATING THE EDGES OF BOARD-SHAPED BLANKS BY MOLDING

[76] Inventor: Gerd Finkensiep, In der Mutte 1, D-5810 Witten 3, Fed. Rep. of Germany

[21] Appl. No.: 860,515

[22] Filed: May 7, 1986

[30] Foreign Application Priority Data

May 8, 1985 [DE] Fed. Rep. of Germany ....... 3516452

[51] Int. Cl.⁴ ...................... B29C 45/14; B29C 19/00
[52] U.S. Cl. .................................. 264/275; 264/278; 264/279; 264/313; 249/83; 249/93; 249/96; 425/DIG. 44
[58] Field of Search ............ 264/313, 275, 279, 279.1, 264/278; 249/93, 88, 90, 84, 83, 96; 425/DIG. 44, 129 R, 127

[56] References Cited

U.S. PATENT DOCUMENTS 3,810,600 5/1974 Smith et al. .................. 264/275

Primary Examiner—Jan H. Silbaugh
Assistant Examiner—Neil M. McCarthy
Attorney, Agent, or Firm—Collard, Roe & Galgano

[57] ABSTRACT

An apparatus and process for molding the edges of a board-shaped blank with plastic material. A one-piece mold is provided made of a material with rubber-like elasticity and having a C-shaped cross section. Two free legs of the mold receive between themselves the edges of the blank and rest against the blank from the top and bottom. The mold is surrounded by a divided mold box, having upper and lower parts supporting the mold on all sides and being compressible perpendicularly to the plane of the blank. Upon compression, free legs of the mold are forced against the blank. In the mold box, spacing elements are arranged on top of and beneath the blank to limit the distance of movement of the parts of the mold box and the compression of the mold.

9 Claims, 1 Drawing Sheet

APPARATUS AND PROCESS FOR COATING THE EDGES OF BOARD-SHAPED BLANKS BY MOLDING

BACKGROUND OF THE INVENTION

This invention relates to an apparatus and process for coating the edges of board-shaped blanks by molding with plastic material. More particularly, it relates to such an apparatus and process for the manufacture of boards or panels for, e.g., kitchen furniture, wherein a mold encloses the edges of the blank on all sides, and has the shape of a frame for receiving the blank, with the frame leaving a hollow space to be filled with the plastic molding material, around the edges of the blank.

In the apparatus or methods of the state of the art (cf. DE-OS No. 32 05 113), a mold made of a rigid material consists of two parts. This two-part mold has the drawback of causing visible edges or projections to remain on the finished workpiece. The visible edges extend along the line of separation or parting line of the mold, and have to be reworked. However, reworking always leaves working marks on the plastic material (e.g., polyurethane PUR), which reduces the quality of the finished workpiece. Another problem associated with this known two-part mold is that the plastic molding material must be prevented from penetrating into the hollow space between the mold and the edge of the blank from which the flat area of the blank extends. To prevent this penetration, the joint between the mold and surface of the blank must be completely sealed, which is especially difficult if the surface of the blank is pitted or provided with some other structure.

Accordingly, it is an object of the invention to provide an apparatus and method for providing molded edges for board-shaped blanks by molding in such a way that no reworking of the finished product is required, and such that a clean joint is achieved between the molded edge and flat area of the workpiece.

SUMMARY OF THE INVENTION

The foregoing and related objects are readily achieved according to the invention, in a mold apparatus wherein the mold is a one-part mold having a C-shaped cross section and made of a material with the elasticity of rubber. The mold includes upper and lower free legs which receive between them the edges of the blank and, within the zone directly adjoining the edges, the legs abut the blank from the top and bottom. The mold is surrounded by a divided mold box having upper and lower sections which are compressible or displaceable together towards the plane of the blank, with the mold box supporting the mold from the bottom, on the outer sides, and from the top. The free legs of the C-shaped mold cross section apply pressure to the blank and seal against it, forming a hollow space therewith. In addition, upper and lower spacing elements are arranged in the mold box on top of and beneath the blank, and limit the distance of movement of the parts of the mold box in the direction of the blank contained in the mold. Preferably, the lower spacing element is connected to the lower box section, and has an outer edge supporting the inner edge of each lower free leg. Most desirably, the mold is made of rubber or of a material having the elasticity of rubber.

By using an undivided mold made of an elastic material, the molded edge produced has completely smooth outer contours, so that no reworking is required. Due to the fact that the free legs of the C-shaped mold cross section are made of an elastic yielding material, and are pressed or forced against the blank from the top and bottom, a clean joint is obtained between the molded edge and the flat area of the blank, even if the blank has pitted surfaces. The spacing elements disposed on top of and beneath the blank prevent the free legs of the mold from being excessively compressed and deformed. By supporting the mold made of elastic material on all sides, excellent accuracy in the size of the final product is obtained, in spite of the elastic compliance of the mold.

In practice, the bottom spacing element is connected with the bottom part of the mold box and its outer edge supports the inner edge of the lower free leg of the mold. In this way, a completely form-locked support of the elastic mold in the bottom part of the box is obtained in an especially advantageous way. In addition, in practice, the top spacing element is a plate detachably connected with the blank. The outer edges of the plate engages the inner edge of the upper free leg of the mold, and in this way centers the blank in the mold. The plate may be fastened onto the blank, for example, with adhesive tape, a detachable adhesive, or with screws. By centering the blank in the mold, the molded edge is assured of having a uniform thickness all around.

The elastic mold and the upper part of the mold box are in practice provided with flush openings for filling the plastic molding material. Due to the fact that the upper part of the mold box is firmly forced against the top side of the elastic mold, the arrangement of the filling openings assures that during the filling operation, the plastic material will not penetrate the intermediate space between the mold box and the mold itself.

In connection with using the apparatus described in the foregoing, in the process according to the invention, the blank is placed in the elastic mold and centered in the mold by means of the top spacing element fixed to the top side of the blank. The mold with the blank centered therein, is placed in a form-locked manner in the bottom part of the mold box. The top part of the mold box is then placed onto the bottom part of the box. Both parts of the mold box are compressed together perpendicularly to the plane of the blank in a way such that free legs of the mold are pressed together until the spacing elements come to rest flat against the blank from the top and bottom. The remaining hollow space of the mold is filled with liquid plastic material. After curing of the plastic material, the finished part is removed from the elastic mold. The finished part produced according to this process requires no reworking. The molded edge is cleanly delimited or defined against the flat area of the product. Furthermore, the finished part so produced is highly accurate in size.

Other objects and features of the present invention will become apparent from the following detailed description considered in connection with the accompanying drawing which discloses a single embodiment of the invention. It is to be understood that the drawing is designed for the purpose of illustration only, and not as a definition of the limits of the invention.

BRIEF DESCRIPTION OF THE DRAWING

In the drawing, wherein similar reference characters denote similar elements throughout the several views.

DETAILED DESCRIPTION OF THE PREFERRED EMBODIMENT

Figure 1:
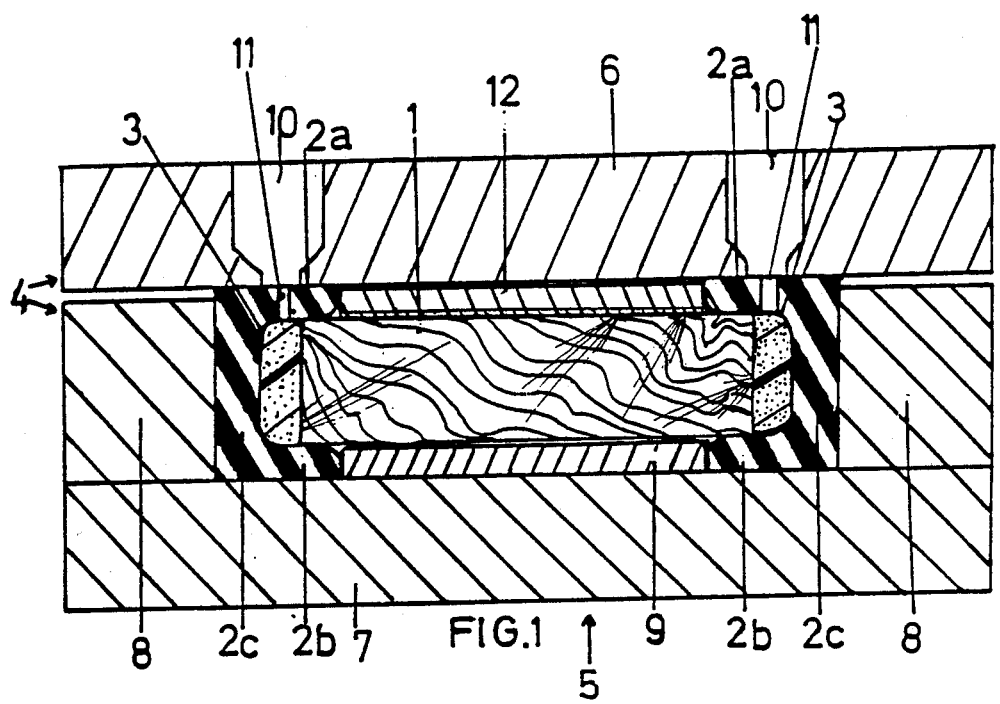
FIG. 1 is a transverse sectional view of the novel apparatus, embodying the present invention, illustrating the mold, mold box, and blank.
Figure 2:
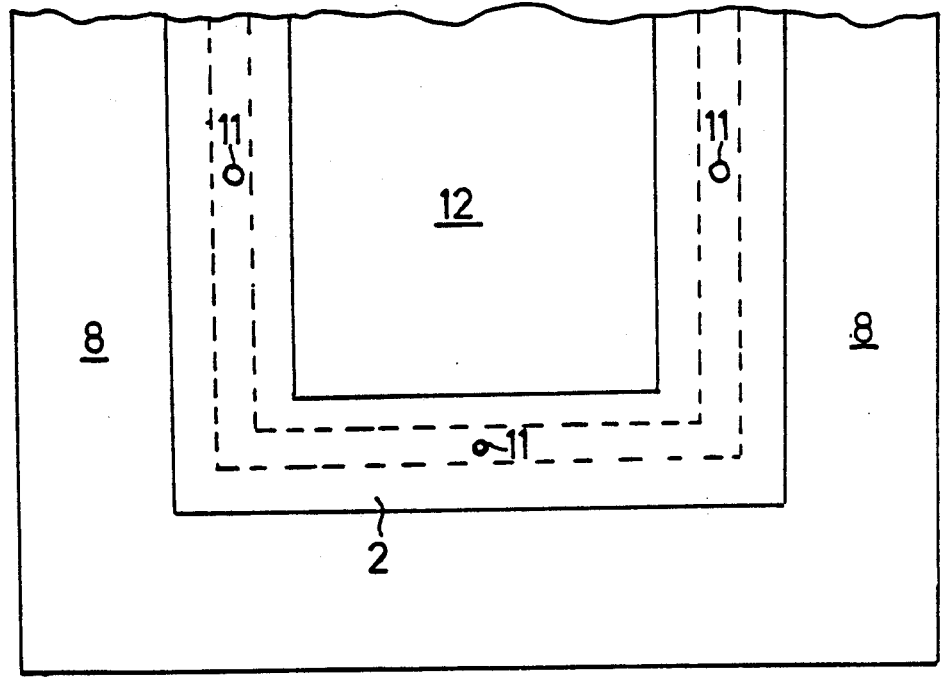
FIG. 2 is a fragmentarily-illustrated top elevational view of the lower part of the mold box with the mold contained therein.

Turning now in particular to the appended drawing, therein illustrated is a mold apparatus embodying the present invention which, as shown in FIGS. 1 and 2, basically includes a board-shaped blank 1 which, e.g., is compressed of a chipboard coated on both sides with plastic material and provided with embossed surfaces. Blank 1 is placed in a one-piece mold 2 made of an elastic material, for example, rubber. Mold 2 has a C-shaped cross section, a top free leg 2a, a bottom free leg 2b, and a center piece 2c connecting the two free legs 2a and 2b. Mold 2 surrounds blank 1 like a frame, with the two free legs 2a and 2b resting against blank 1 from the top and bottom, and with a hollow space 3 left between center piece 2c and the edges of blank 1. Hollow space 3 is fillable with plastic molding material.

Mold 2 is arranged in a mold box 4 having a bottom part 5 and a top part 6. Bottom part 5 includes a bottom plate 7 and upwardly projecting walls 8. The bottom plate 7 and walls 8 support the inserted mold 2 in a form-locked manner from the bottom and outwardly on all sides. Furthermore, a spacing element 9 is connected with bottom plate 7, and projects upwardly with its outer edge, supporting the inner edge of the lower free leg 2b of mold 2 in a form-locked manner. The thickness of the spacing element 9 is slightly less than that of lower free leg 2b.

Top part 6 of mold box 4 is basically provided in the form of a flat lid or cover resting on elastic mold 2 from the top, i.e., on the top free leg 2a of mold 2. Vertically extending filling openings 10 are provided in top part 6 of mold box 4 for filling the plastic molding material into space 3. Openings 10 are disposed flush with matching filling openings 11 in the top free leg 2a of mold 2.

A plate-shaped spacing element 12 is secured on the top side of blank 1 with adhesive tape or by other suitable fastening means. Plate-shaped spacing element 12, on its outer edge, is joined in a form-locked manner with the inner edge of the upper free leg 2a of mold 2, and centers blank 1 in mold 2 in a way such that hollow space 3 has an even width on all sides. Again, the thickness of spacing element 12 is slightly less than that of the upper free leg 2a of mold 2.

As indicated by the arrow in FIG. 1, the assembled or closed mold box can be compressed perpendicularly to the plane of the blank with deformation of the free legs 2a and 2b until the spacing elements 9 and 12 come to rest against the blank from the bottom and top, respectively. The amount by which free legs 2a and 2b of elastic mold 2 can be pressed together is determined by the difference in thickness between the spacing elements 9 and 12 and the free legs 2a and 2b, respectively. Of course, walls 8 of the lower part of the mold project upwardly only to an extent such that the top part 6 of the mold can be pressed downwardly at least by the sum of the two differences in thickness.

In order to permit the two free legs 2a and 2b to be pressed together without causing the elastic material to give way by entering the hollow space 3, the free legs 2a and 2b have slightly tapered ends, so that the elastic material may yield towards said tapered ends when the free legs are pressed together.

In the process according to the invention, blank 1 is first placed in elastic mold 2 and is centered therein by means of top spacing element 12, which is fixed to the top side of the blank. Subsequently, mold 2 with the centered blank contained therein, is placed in the bottom part 5 of mold box 4, wherein the elastic mold 2 is supported on all sides in a form-locked manner by bottom plate 7, walls 8 and spacing element 9. Thereafter, top part 6 of mold box 4 is placed on bottom part 5. Both parts 5 and 6 of mold box 4 are compressed perpendicularly to the plane of blank 1 by means of a pressing or pressure-applying device (not shown) in such a way that the free legs 2a and 2b of mold 2 are pressed together until spacing elements 9 and 12 are flatly adjoining blank 1 from the bottom and top. Subsequently, hollow space 3 is filled with a liquid, curable plastic material, preferably polyurethane (PUR). Following curing of plastic material, mold box 4 is opened and the finished part is removed from elastic mold 2.

Thus, while only a single embodiment of the invention has been shown and described, it will be obvious that many changes and modifications may be made thereunto, without departing from the spirit and scope of the invention.

I claim:

1. An apparatus for molding edges of board-shaped blanks with a molding material, wherein a mold fully surrounds the edges of the blank, and the mold has the shape of a frame for receiving the blank including at the edges of the blank a hollow space fillable with molding material, which comprises:

a one-piece mold having said shape of a frame and being of substantially a C-shaped cross section and made of an elastic material, including opposing upper and lower free legs, each having an inner peripheral edge;

a mold box dimensioned to support said mold on all sides and having an upper section and a lower section; and upper and lower spacing elements, each having an upper peripheral edge, said upper and lower spacing elements disposed within said inner peripheral edges and on top of and beneath the blank, wherein said mold is substantially disposed in the lower section of said mold box and said legs are disposed to receive therebetween the blank onto which edges are to be molded, said lower section supporting said mold on its sides and bottom, and said mold being deformable under pressure from said upper section exerted perpendicular to the plane of the blank, thereby forcing said free legs to sealably engage against said blank, said spacing elements limiting the displacement under pressure of said upper and lower sections, such that said hollow space may be filled with a molding material which due to its confinement by said mold produces a smooth mold edge which does not require any reworking.

2. The apparatus according to claim 1, wherein said lower spacing element is connected to said lower section and said outer peripheral edge thereof supports said inner peripheral edge of said lower free leg of said mold.

3. The apparatus according to claim 1, wherein said upper spacing element is a plate detachably and centrally mounted to the blank, said plate supporting itself with its outer perimeter on the inner peripheral edge of said upper free leg of said mold, said upper spacing element centering the blank in said mold, such that when said blank is inserted into said mold, said space is uniform all around, allowing for a uniform molding on all sides of the blank.

4. The apparatus according to claim 1, wherein said mold and said upper section are provided with filling openings for the molding material, said openings being arranged flush.

5. The apparatus according to claim 1, wherein said mold is made of a material having the elasticity of rubber.

6. The apparatus according to claim 1, wherein the mold is made of rubber.

7. A process for molding edges onto board-shaped blanks, comprising the steps of:

placing a blank in a one-piece elastic mold having the shape of a frame and including upper and lower free legs, each having an inner peripheral edge, and having a substantially C-shaped cross section, the legs engaging the blank to form a hollow space between the mold and edges of the blank;

centering the blank in the mold by positioning upper spacing means fixed to the upper surface of the blank within the inner peripheral edge of the upper free leg;

placing a lower spacing means underneath the blank within the inner peripheral edge of the lower free leg and supporting the mold on its sides and bottom with lower supporting means;

compressing the mold by forcing upper covering means towards the lower supporting means, thereby causing the upper and lower free legs of the mold to seal against the blank, the compression being limited by the upper and lower spacing means;

filling the hollow space with molding material; and removing the blank from the mold after the molding material is cured.

8. The method according to claim 7, wherein said molding material is polyurethane.

9. The method according to claim 7, wherein the hollow space is filled via filling openings in the upper covering means flushly abutting corresponding openings in the mold.

* * * * *